Oct. 30, 1923.
W. McNAMES
AUTOMOBILE CHECK
Filed March 9, 1922
1,472,727
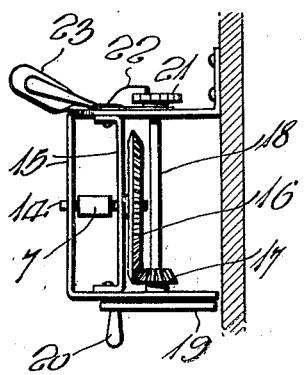
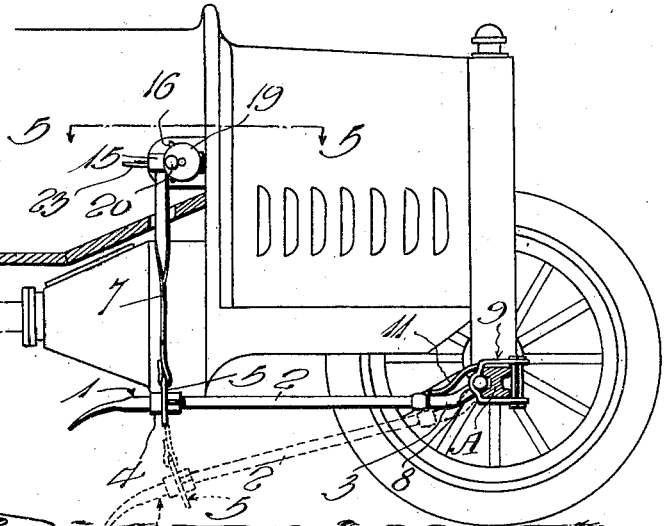
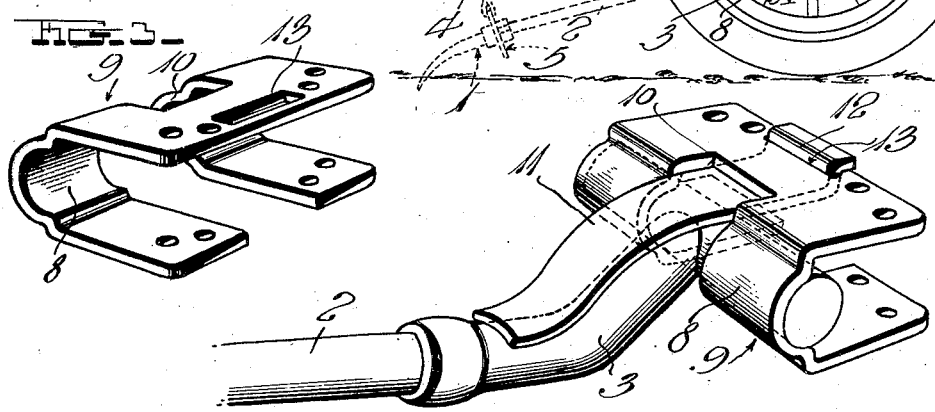
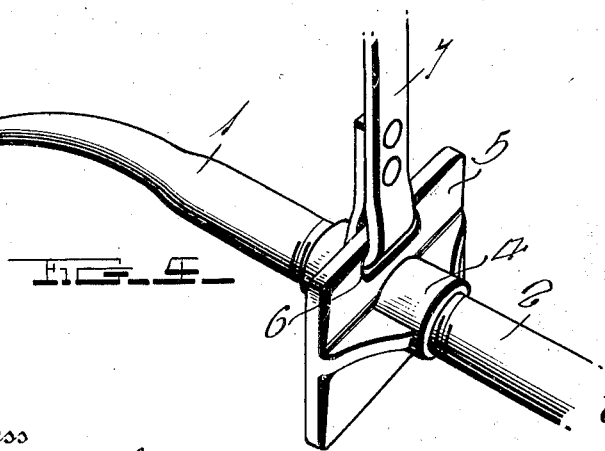
Inventor
W. McNames
Witness
H. Woodard
By H. B. Wilson & Co.
Attorneys Patented Oct. 30, 1923.

1,472,727

UNITED STATES PATENT OFFICE.

WILLIAM McNAMES, OF ABERDEEN, SOUTH DAKOTA.

AUTOMOBILE CHECK.

Application filed March 9, 1922. Serial No. 542,371.

*To all whom it may concern:*

Be it known that I, WILLIAM MCNAMES, a citizen of the United States, residing at Aberdeen, in the county of Brown and State of South Dakota, have invented certain new and useful Improvements in Automobile Checks; and I do declare the following to be a full, clear, and exact description of the invention, such as will enable others skilled in the art to which it appertains to make and use the same.

This invention relates to an improved device which may be conveniently termed an automobile check, the same being designed for connection to one of the axles of the vehicle in such a manner as to permit it to serve to prevent retrograde movement of the automobile on hills in case the motor accidentally becomes inoperative.

The principal object of the invention is to generally improve upon Patent 1,398,440 granted to me for a similar invention on the 29th of November, 1921.

Referring briefly to this patent, it will be seen that a pointed gravity lowered bar or rod is pivotally mounted on the front axle of the vehicle by a clamp and is raised and lowered by means of a suitable flexible hoisting element which is connected therewith near the free or ground-engaging end.

Inasmuch as the bar will not rapidly drop down against the ground in many instances and will not stay in engagement with the ground under certain circumstances, I contemplate in the present application, to associate with the same, a spring which has one end bearing on the bar in such a manner as to rapidly force it down when released and to maintain it in yieldable engagement with the surface of the road.

Another and very important object of the invention is to improve upon the construction of the bar by providing one which can be formed from ordinary gas pipes and the like, the parts being detachably connected with one another and being thus rendered capable of separation for storage in compact spaces, and this particular construction being extremely advantageous in that it enables the device to be manufactured and retailed at a comparatively small cost.

A further object of the invention is to associate with the device, novel means for rapidly hoisting the flexible strap and permitting release thereof by means of the driver's foot.

Other objects and advantages of the invention will be apparent during the course of the following description.

In the accompanying drawings forming a part of this specification and in which like numerals are employed to designate like parts throughout the same:

Figure 1 is a side elevational view of a portion of a conventional type of automobile equipped with a check constructed in accordance with this invention.

Figure 2 is an enlarged detail perspective view of the outer end of the check showing the construction of the clamp and spring which coacts therewith.

Figure 3 is a detail perspective view of the axle-engaging clamp.

Figure 4 is a perspective view of the lower end of the ground-engaging device showing the construction of the lower free end more clearly.

Figure 5 is an enlarged detail section taken on the line 5—5 of Figure 1.

In carrying out the invention it will be seen that I make use of a novel ground-engaging member which is preferably in the form of a rod composed of a pointed section 1, an intermediate tubular section 2, and a T-member 3. As seen clearly in Fig. 2, the forward end of the tubular section 2 is threadedly engaged with and telescopes into the internally screw-threaded hollow end of the shank of the T-member 3. A coupling 4 serves to connect the intermediate tubular section with the pointed end member 1 and this coupling carries a substantially rectangular plate-like part 5 having a slot 6 formed therein to permit passage of the lower end of the hoisting strap 7.

The head of the T-member is pivotally mounted in the channel-shaped connecting portion 8 of a substantially U-shaped axle engaging clamp 9, a portion of this head bearing directly against the rear face of the front axle A of the automobile when the device is in use, thus relieving the clamp of excessive strain and exerting a direct push against the axle. As in my patented construction, a portion of the clamp is cut out as indicated at 10 and this permits passage of the shank of the T-member and it also permits passage of one end of a flat longitudinally bowed spring 11. This end of the flat spring underlies or is disposed between the upper flange of the clamp and the corresponding and adjacent side of the axle and it has an angularly off-set portion 12, this off-set portion extending through an elongated slot 13 formed in the upper flange of the clamp. The opposite end of the spring is curved transversely to conform to the shank of the T-member and this end bears against said shank and exerts a downward pressure on the ground-engaging member so that as soon as it is released, it will be forcibly swung down and engaged with the ground, and will be maintained in yieldable engagement therewith.

As before indicated, a flexible leather strap 7 is substituted for the hoisting chain and the upper end of this strap is wound on a shaft or drum 14 mounted between the spaced parallel members 15 of a supporting structure secured to the dash or foot board or any other part of the vehicle to be in convenient operating distance of the driver's foot. A beveled gear or the like 16 is fixed on the drum 14 and connected with a gear 17 fixedly mounted on a rotary shaft 18, also arranged on said supporting structure. Secured to one of the projecting ends of the shaft 18 is a disk 19 carrying a small handle 20 by means of which rotation is imparted to the shaft and in turn to the drum for winding the belt thereon to hoist the ground-engaging member. On the opposite end of this shaft is a ratchet 21 with which a pivoted dog or the like 22 co-acts. This dog is spring-pressed and held in effective engagement with the ratchet and is provided with a widened free end 23 which serves as a footpiece. It is obvious that by placing the foot against this enlarged end 23 and pressing downwardly, the dog will be disengaged from the ratchet and the aforesaid drum will be permitted to rotate in a direction to permit unwinding of the belt and lowering of the ground-engaging member, and the spring 11 will greatly assist in rapidly engaging said member with the ground to immediately check any retrograde movement of the vehicle. It is also understood that by grasping the knob or handle 20 and rotating the shaft 18 in the proper direction, the strap can be again wound onto the drum for elevating and maintaining the ground-engaging member in inoperative position.

In use, the U-shaped clamp is bolted or otherwise connected with the front axle of the vehicle in the manner illustrated so that the channel-shaped connecting portion 8 thereof lies opposite the space between the upper and lower flanges of the axle. The head of the T-shaped member 3 is fitted in this space and channel-shaped connecting portion of the clamp and is permitted to have free rotation. The aforesaid hoisting device including the drum for the flexible hoisting strap is secured in any suitable way to a convenient part of the vehicle adjacent the driver's foot. Assuming that the parts are in the position illustrated in Figure 1, it will be seen that when the operator places his foot against the enlarged end of the dog and trips it, the hoisting strap will be released and will permit the ground engaging member to be forced into engagement with the ground. The point on the lower end thereof will embed itself into the surface and the flat spring described will maintain the ground-engaging member in yieldable engagement with the ground, thus insuring effective operation of the device. When the device is not in use, the shaft 18 is rotated and the strap is wound onto the smaller shaft or drum 14 in the manner hereinbefore described. In some instances it may be found desirable and advisable to drop the ground-engaging member as soon as the vehicle starts to climb a hill, because it will then be in a position to immediately stop any retrograde movement in case of accident or stoppage of the motor. It is of course obvious that forward movement of the vehicle would not be retarded when the ground-engaging member is in operative position.

By carefully considering the description in connection with the drawings, persons familiar with devices of this class will doubtless be able to obtain a clear understanding of the invention. Therefore, a more lengthy and detailed description is deemed unnecessary.

Since probably the best results may be obtained with the construction and arrangement herein shown and described, this is taken as the preferred embodiment of the invention. However, I wish it to be understood that minor changes coming within the scope of the invention as claimed may be resorted to if desired.

I claim:—

1. A device of the class described comprising an axle clamp, a ground engaging member pivotally connected thereto, said clamp having an opening, and a flat spring having one end off-set and received in said opening, the free end of the spring bearing on said member to maintain it in yieldable engagement with the ground.

2. A vehicle check comprising a ground-engaging member having a cross-head at its forward end, a substantially U-shaped axle engaging clamp having an opening formed in its bight portion for passage of the shank of said member, said head being seated in the bight portion of said clamp so as to permit pivotal movement of said member, and a flat spring passing through the opening in said clamp and having one end detachably connected with the upper flange of the clamp with its opposite end bearing on said member, as and for the purpose described.

3. A vehicle check comprising a substantially U-shaped clamp, the flanges of which are adapted to rest against the upper and lower sides of the vehicle axle, the bight portion of said flanges being formed with an opening, a ground-engaging device having a T-shaped member at its forward end, the head of said member rotatably engaging said bight portion of the clamp and the shank thereof passing through the opening in the bight portion, and a longitudinally bowed flat resilient spring having its forward end off-set and received in an opening in the upper flange of said clamp, said spring passing through the opening in the bight portion of the latter and having its free end bearing against the ground-engaging member, as and for the purpose described.

4. A ground-engaging member comprising a T-shaped member, the shank of which is formed with screw-threaded socket, an intermediate part having screw-threads at its opposite ends, one of said screw-threaded ends being threaded into said socket, a pointed ground-engaging portion, and a coupling connecting the latter and said intermediate part, said coupling being provided with a plate-like portion or flange having an opening to permit connection thereto of a hoisting element.

5. A vehicle check comprising a substantially U-shaped clamp designed to be connected with a vehicle axle, the upper flange of said clamp being formed with an opening, a ground engaging member having a head at its forward end pivotally connected with said clamp, a flat spring having one end disposed in the opening of said clamp with its opposite end engaging said member, a flexible hoisting element connected with the free end of said member, a drum on which the upper end of said element is designed to be wound, means for rotating said drum, and a foot-actuated trip for controlling said means.

6. A device of the class described embodying a U-shaped clamp having bolt-openings formed in its flanges, the upper flange of the clamp being also formed with an elongated opening adapted to receive one end of a spring, the bight portion of the clamp being semi-circular in cross section to form a bearing in which the head of a ground engaging member is adapted to be rotatably received, said bight portion being intersected by a notch forming an opening for passage of the spring and the shank of the ground engaging member.

In testimony whereof I have hereunto set my hand this 3rd day of March, 1922.

WILLIAM McNAMES.